(12) United States Patent
Carberry et al.

(10) Patent No.: US 6,467,970 B1
(45) Date of Patent: Oct. 22, 2002

(54) REMOVABLE OPTICAL ADAPTER AND RECEPTOR

(75) Inventors: John Carberry, Talbott, TN (US); Michael L. Smith, Jefferson City, TN (US); Richard Racinskas, Coppell, TX (US)

(73) Assignee: Neptec Optical Solutions, Inc., Jefferson City, TN (US)

( * ) Notice: Subject to any disclaimer, the term of this patent is extended or adjusted under 35 U.S.C. 154(b) by 95 days.

(21) Appl. No.: 09/685,116

(22) Filed: Oct. 10, 2000

(51) Int. Cl.[7] .................................................. G02B 6/38
(52) U.S. Cl. ........................................... 385/56; 385/70
(58) Field of Search ...................................... 385/53–94

(56) References Cited

U.S. PATENT DOCUMENTS

| | | |
|---|---|---|
| 4,820,185 A | 4/1989 | Moulin |
| 5,214,735 A | 5/1993 | Henneberger et al. |
| 5,274,729 A | 12/1993 | King et al. |
| 5,717,801 A * | 2/1998 | Smiley .......................... 385/60 |
| 5,909,526 A | 6/1999 | Roth et al. |
| 6,186,670 B1 | 2/2001 | Austin et al. |

* cited by examiner

*Primary Examiner*—Akm E. Ullah
*Assistant Examiner*—Jerry T Rahll
(74) *Attorney, Agent, or Firm*—Pitts & Brittain, PC

(57) ABSTRACT

An apparatus, comprising a removable optical adapter and receptor, which does not require the opening of a box to which the receptor is secured in order to remove the adapter. The adapter has a flange extending outwardly from the adapter body. The receptor is a mounting plate with a first aperture, which is slightly larger than the adapter flange, and a second aperture disposed parallel to the front surface. The receptor is fastened to a box, which contains at least one fiber optic connector. The adapter flange is inserted into the first aperture until it seats on a lip or shoulder adjacent to the second aperture. When the adapter is rotated, the adapter flange engages the second aperture. The receptor has a front and back surface which can be parallel, in which case the adapter, when inserted into the receptor, is perpendicular to the box face, or it can have a front and back surface which form the shape of a wedge, in which case the adapter forms an angle defined by the long axis of the adapter body and the plane of the box face. The removable adapter can be removed from the receptor, which is fastened to a box, without opening the box, and the adapter can be positioned such that the cable exits the adapter in the general direction of the cable routing.

22 Claims, 4 Drawing Sheets

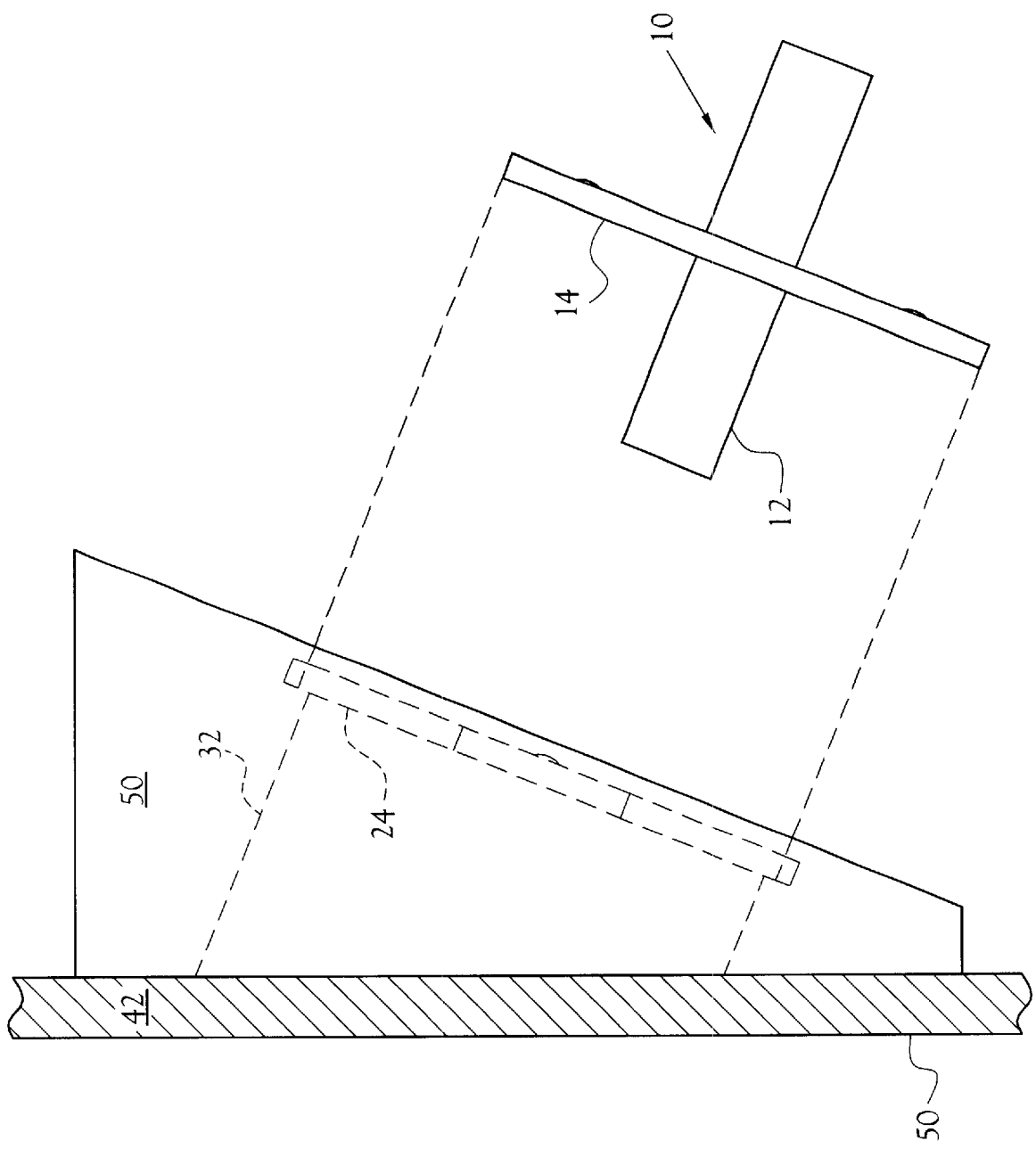

REMOVABLE OPTICAL ADAPTER AND RECEPTOR

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of Invention

This invention pertains to adapters for fiber optic cables. More particularly, this invention pertains to a fiber optic adapter which is removable from a receptor attached to the outside of a box.

2. Description of the Related Art

Optical fibers are commonly used for the transmission of all types of data, including telecommunications, video, and computer data. Unlike copper cables which use mechanical connections to terminate to equipment, fiber optic cables rely upon optical connectors for termination.

An optical connector consists of a ferrule, through which the optical fiber is fed. The distal end of the ferrule and fiber combination is polished to a precise endface geometry. The ferrule and fiber endface is butted to another fiber optic cable's ferrule and fiber endface, bringing the fiber endfaces into precise physical contact. In order to minimize signal loss, the fiber and ferrule endfaces must have a very smooth and clean surface. Cleanliness of the fiber and ferrule endface is critical to the good performance of fiber optic connectors. Recently, awareness and concern about connector cleanliness has grown dramatically due to a number of factors, including the value of traffic, the growth of bandwidth, the growth of mechanical connector use, and network sensitivity.

Considering the small size of fiber cores (9 microns for a single mode fiber), it is easy to understand how contaminants such as dirt or oil can affect the performance of fiber-optic connectors. The polished surfaces can be scratched when the connectors are repeatedly mated, if the optical fibers rotate after they come in contact, or if a foreign particle is on one of the connector end faces. Also, the connectors and associated hardware are constructed of materials which are rich in hydrocarbons and materials which tend to outgas and create relatively large partial pressures of these materials. The space wherein the fibers and connectors mate is so small that it can be considered a capillary space. As a result, these gaseous products tend to "wick" into the space and deposit. For these reasons, it is now understood that the polished optical surfaces must be protected from physical damage and contamination and must be periodically cleaned.

It is important to note that all connectors must be mated in an adapter, which consists of a housing geometry suitable to the connector type and a "floating" split sleeve that accepts and aligns the connectors for precise mating of the small fiber cores used for single mode fiber. The molded glass-filled thermoplastic alignment sleeves commonly used can also be a source of contamination because the ferrules scrape the material of the sleeve each time the connectors are mated.

Often, the adapter defines the interface between an outside box connector and an inside box connector. Normally, only the connector on the outside is accessible for cleaning, while the connector on the inside is inaccessible without opening the box. In most cases the manufacturer of the box prohibits opening the box because of the potential for damaging sensitive and critical internal components, among other reasons. Therefore, it would be beneficial to be able to remove the adapter and remove the inside connector without opening the box. After cleaning, it would be beneficial to be able to replace the inside connector and the adapter without opening the box. Furthermore, fiber optic cable has very strict bend radius requirements and it would be beneficial if the adapter were positioned on the box such that cable bends are minimized.

Therefore, it is an object of the present invention to provide a means for removing an adapter from a box after the adapter has been secured to the box.

It is a further object of the present invention to be able to remove and replace the adapter without entry into the box.

It is a still further object of the present invention to remove and replace the adapter from the box without resort to tools or other devices.

Another object of the present invention is to provide a means for mounting the adapter to the box such that the fiber optic cable exits the adapter in the general direction of the cable routing.

Other objects and advantages over the prior art will become apparent to those skilled in the art upon reading the detailed description together with the drawings as described as follows.

BRIEF SUMMARY OF THE INVENTION

According to a preferred embodiment of the present invention, a removable adapter and a receptor is disclosed which comprises an adapter and a mounting plate, whereby the adapter is releasably secured in the mounting plate. The adapter has an adapter flange bisecting the adapter body. The mounting plate, which is attached to a box face, has a first aperture penetrating its front surface and a second aperture or slot in the same plane as the front surface but disposed between the front surface and the back surface of the plate. The second aperture intersects the first aperture. The first aperture has a seating lip or shoulder which protrudes into the first aperture adjacent to the back surface of the mounting plate. The adapter is inserted into the first aperture and rotated such that the adapter flange is lockably disposed in the second aperture. The means for locking the adapter in the mounting plate includes detents in the mounting plate which lockably engages recessess on the adapter flange. An alternative embodiment for the locking means includes the second aperture being tapered such that the adapter flange is wedged between the inside surfaces of the second aperture.

An alternative embodiment of the receptor includes forming the receptor such that its front surface and its back surface are not parallel, but instead, the planes formed by the two surfaces intersect, resulting in the receptor having a wedge shape. In this alternative embodiment, after the adapter is lockably disposed in the second aperture, the adapter's long axis is not perpendicular to the box face on which the receptor is disposed, but is at an approximately 22 degree angle to the box face. This angle serves to reduce bending of the fiber optic cable as it is routed away from the adapter.

BRIEF DESCRIPTION OF THE SEVERAL VIEWS OF THE DRAWINGS

The above-mentioned features of the invention will become more clearly understood from the following detailed description of the invention read together with the drawings in which:

FIG. 5 is a top plan view of an alternative embodiment of the receptor where the receptor has a wedge shape.

DETAILED DESCRIPTION OF THE INVENTION

Figure 1:
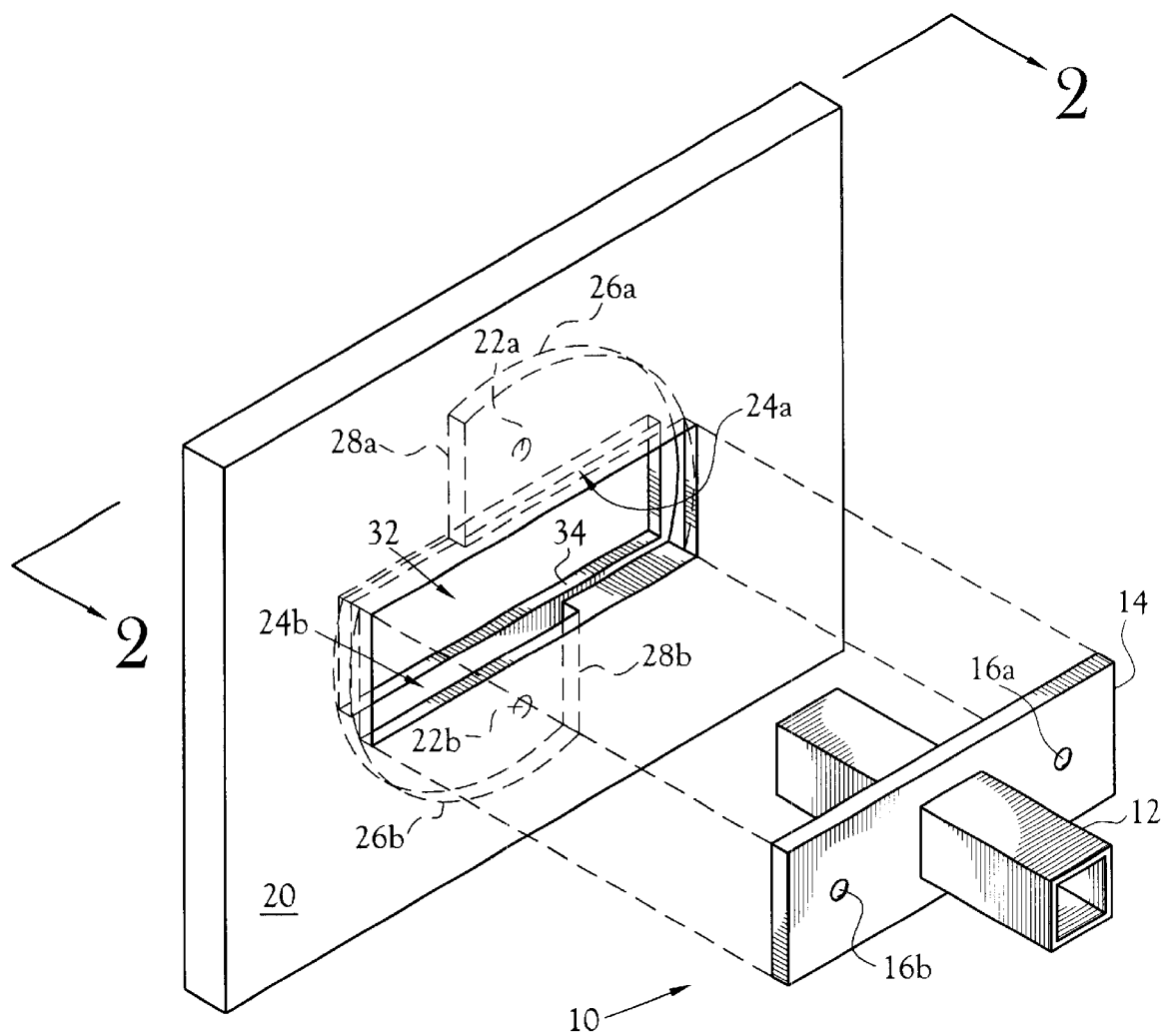
FIG. 1 is a perspective view of the adapter and receptor.

FIG. 1 illustrates a preferred embodiment of the present invention which comprises a removable adapter 10 and a receptor which is shown as a mounting plate 20. The various figures illustrate an adapter 10, which is an SC type adapter for fiber optic connectors. Those skilled in the art will recognize that adapters for other types of fiber optic connectors and adapters for other types of media besides fiber optic can be used without interfering with the objects and advantages of the present invention.

The adapter 10 has a body 12 bisected perpendicularly by an adapter flange or tabs 14. Those skilled in the art will recognize that the configuration and orientation of the adapter flange 14 may be varied without interfering with the objects and advantages of the present invention. As examples of alternative embodiments, the adapter flange 14 may have rounded corners or be oblong or otherwise have a shape other than rectangular. The adapter flange 14 may be oriented on the adapter body 12 such that it is not perpendicular to the adapter body 10. The adapter flange 14 may be located near the distal end of the adapter body 10. Also, the adapter body 10 may not be centered in the adapter flange 14. Another example of an alternative embodiment is where the adapter flange 14 extends from only one side of the adapter body 12, that is, there is only a single tab extending outwardly from the body 12.

The receptor, which in the preferred embodiment is a mounting plate 20, has a first aperture or through-opening 32 which is of the same general shape as the adapter flange 14 and is slightly larger than the adapter flange 14 such that the adapter flange 14 can be inserted into the first aperture or through-opening 32. The first aperture 32 has a seating lip or shoulder 34 which extends into the first aperture 32 for a distance such that the adapter flange 14 is stopped from passing completely through the mounting plate 20 and the adapter 10 is disposed to be adjacent to the second aperture 24. The seating lip 34 can extend into the first aperture 32 such that the adapter body 12 has sufficient clearance to rotate without being obstructed by the seating lip 34, thereby preventing the intrusion of contaminants into the box 42.

Figure 2:
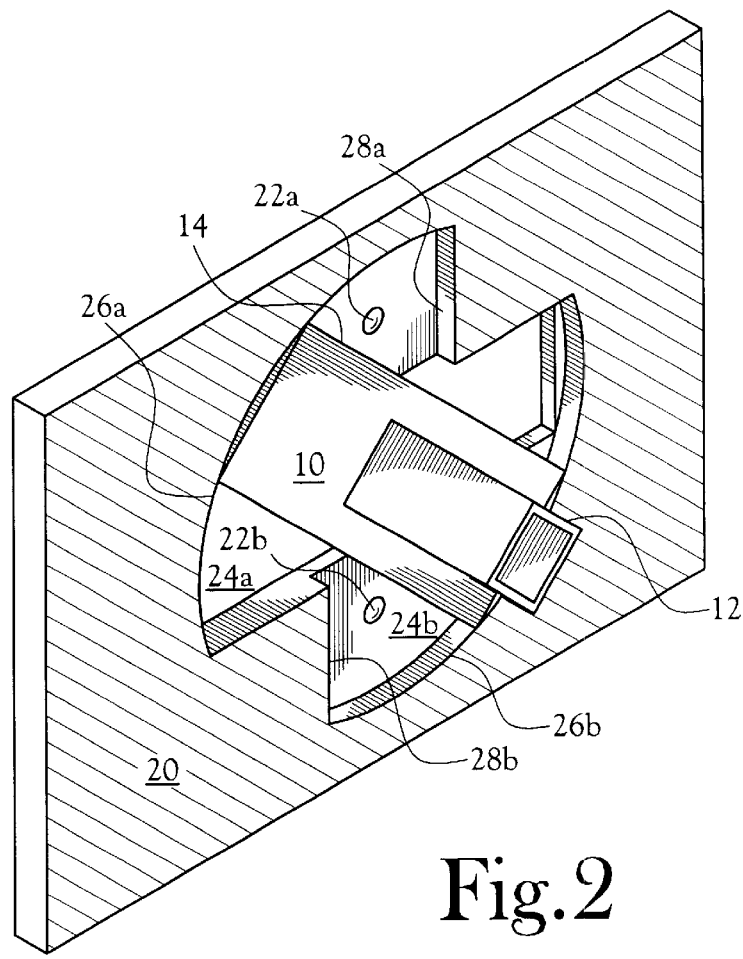
FIG. 2 illustrates a cut-away view of the receptor with an adapter inserted and partially rotated to the locked position.

The mounting plate 20 has a second aperture 24 which is disposed parallel to and between the front surface and the back surface of the mounting plate 20, forming slots 24a, 24b between the front surface and the back surface and with each slot 24a, 24b extending on either side of the first aperture or through-opening 32. Each of the slots 24a, 24b comprises an inside back surface and an inside front surface which are separated sufficiently that the adapter flange 14 passes between the two surfaces. A section view, looking towards the front, of the mounting plate 20 showing the second aperture 24 is illustrated in FIG. 2.

Each of the slots 24a, 24b has a curved surface 26a, 26b defined by an arc with a radius larger than the distance from the adapter body 12 center point to the most distant corner of the adapter flange 14. This curved surface permits the adapter flange or tabs 14 to rotate around the adapter body 12 center point in the second aperture 24. Additionally, each slot 24a, 24b has a stop surface 28a, 28b upon which the leading edge of the adapter flange or tab 14 rests after the adapter 10 has been fully rotated. In other words, each tab 14 rotates around the center of the adapter body 12 until it is seated in the slot 24 by resting against the stop surface 28.

The adapter 10 is locked in the fully rotated position when detents 22a, 22b on the inside front surface of each slot 24a, 24b engage recesses 16a, 16b in the adapter flange 14. The detents 22a, 22b are rounded protrusions which cooperate with the recesses 16a, 16b. Those skilled in the art will recognize that, without interfering with the objects and advantages of the present invention, the detents 22a, 22b may be disposed on either the inside back surface or the inside front surface of the slots 24a, 24b, provided the recesses 16a, 16b are disposed on the corresponding surface of the adapter flange 14. Alternatively, the detents may be disposed on the adapter flange 14 with the recesses being disposed on the corresponding inside surface of the slots 24a, 24b.

Figure 3:
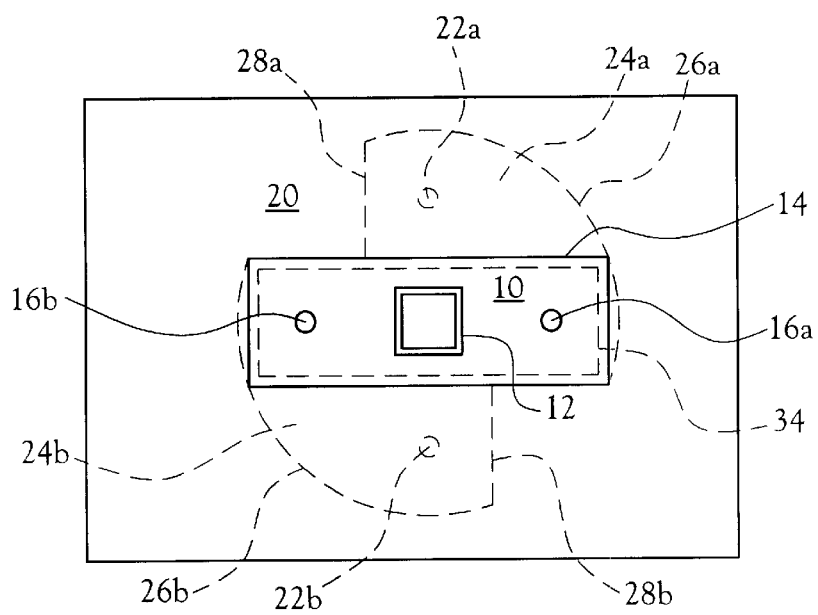
FIG. 3 illustrates a front view of an adapter which is inserted, but not rotated, in the receptor.

FIG. 3 illustrates a front view of the mounting plate 20 with the adapter 10 inserted into the first aperture 32 and seated on the lip 34. From the position illustrated in FIG. 3, the adapter 10 is rotated counterclockwise until the detents 22 engage the recesses 16 in the adapter flange 14. Those skilled in the art will recognize that, alternatively, the orientation of the slots 26 may be such that the adapter 10 is rotated clockwise to be disposed in the mounting plate 20 without interfering with the objects and advantages of the present invention.

Figure 4:
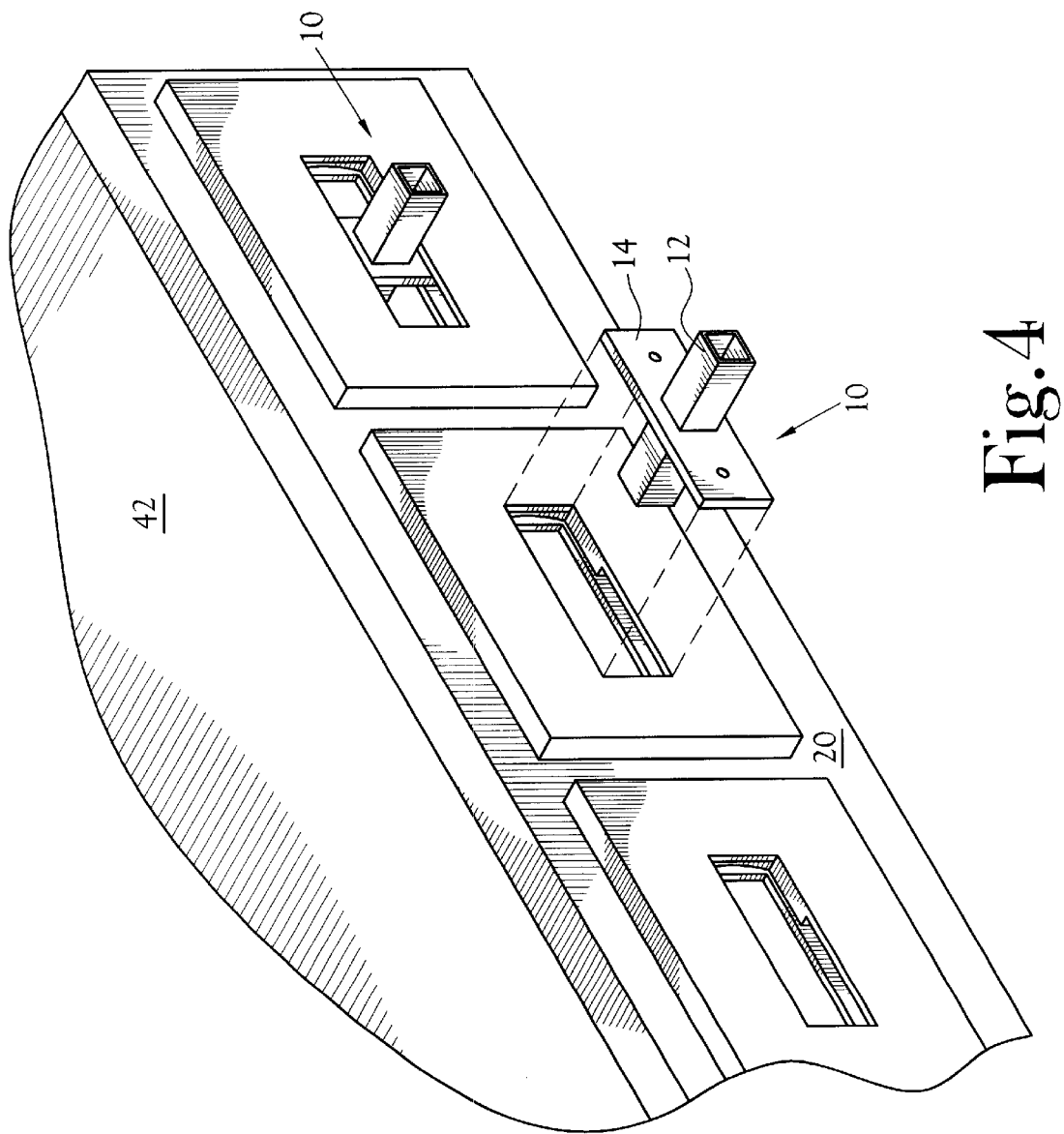
FIG. 4 is a perspective view of a plurality of receptors attached to a box.

A plurality of mounting plates 20 fixed to a box 42 is illustrated in FIG. 4. The back surface of the mounting plate 20 has means for fixedly securing the mounting plate 20 over an aperture in the face of a box 42. The aperture in the face of the box 42 permits the end of the adapter 10 to protrude into the box 42 after the mounting plate 20 is fixedly attached to the face of the box 42.

An alternative embodiment of a receptor is illustrated in FIG. 5, which is a top plan view of a mounting plate 50. Unlike the mounting plate 20 of the preferred embodiment, which has a front surface parallel to the back surface, the front surface and back surface of mounting plate 50 form planes which intersect, forming a wedge shaped mounting plate 50. The first aperture 32 of the mounting plate 50 has walls that are perpendicular to the plane of the front surface. The second aperture 24 of the mounting plate 50 is parallel to the plane of the front surface. This configuration results in the adapter 10 protruding from the mounting plate 50 at an angle from perpendicular which is equal to the angle between the front and back surfaces of the mounting plate 50. The preferred embodiment for this alternative has an angle of approximately 22 degrees between the front and back surfaces of the mounting plate 50. Those skilled in the art will recognize that the angle between the front and back surfaces of the mounting plate 50 may vary without interfering with the objects and advantages of the present invention.

From the forgoing description, it will be recognized by those skilled in the art that a removable fiber optic adapter 10 and mounting plate 20 offering advantages over the prior art has been provided. Specifically, the adapter 10 and the mounting plate 20 provide an easy means for quickly and conveniently removing the adapter 10 from a box 42 which has a mounting plate 20 fixed to one face. Also, the mounting plate 50 permits the adapter 10 to be positioned such that the outside cable which exits the adapter 10 is angled in the direction of the cable as it is routed away from the box 42.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. An apparatus for mating a pair of fiber optic connectors, said apparatus comprising:

an adapter including an adapter body and an adapter flange, said adapter body having a first fiber optic connector end and an opposite second fiber optic connector end, said first connector end integrally associated with said second connector end, said first connector end and said second connector end axially aligned; and a receptor having a first aperture configured to releasably receive said adapter flange, and a second aperture cooperating with said adapter flange when said adapter body is rotated;

whereby after said first aperture receives said adapter flange, said adapter body is rotated and said adapter flange cooperates with second aperture, and said adapter becomes fixedly disposed in said receptor.

2. The apparatus of claim 1 wherein said apparatus further comprises means for lockably securing said adapter flange in second aperture.

3. The apparatus of claim 2 wherein said means for lockably securing comprises a detent disposed on said adapter flange and a cooperating notch defined on a face of said second aperture.

4. The apparatus of claim 2 wherein said means for lockably securing comprises a detent disposed on a face of said second aperture and a cooperating notch defined on said adapter flange.

5. The apparatus of claim 2 wherein said means for lockably securing comprises an inside back surface of said second aperture, an inside front surface of said second aperture, and an inside stop surface of said second aperture, wherein the distance between said inside back surface and said inside front surface varies from a maximum separation greater than the thickness of said adapter flange to a minimum separation, disposed at said inside stop surface, approximately equal to the thickness of said adapter flange, whereby friction forces provide said means for lockably securing said adapter flange in second aperture.

6. The apparatus of claim 1 wherein said receptor is a mounting plate with a front surface and a back surface disposed in substantially parallel planes.

7. The apparatus of claim 1 wherein said receptor has a front surface and a back surface disposed in intersecting planes whereby said receptor has a wedge shape.

8. The apparatus of claim 1 wherein said first aperture has a seating lip disposed adjacent to a back surface of said receptor, whereby said adapter flange, when inserted in said first aperture, is disposed in contact with said seating lip and is disposed adjacent to said second aperture, whereby said adapter can be rotated causing said adapter flange to cooperate with said second aperture.

9. An apparatus for mating a pair of fiber optic connectors, said apparatus comprising:

an adapter including a coupler configured to releasably receive the pair of fiber optic connectors at a first coupler end and an opposite second coupler end, said adapter having at least one tab extending outwardly from said coupler; and a receptor defining a through-opening configured to releasably receive said adapter, said through-opening defining at least one slot cooperating with said at least one tab, said slot receiving said tab when said adapter is rotated within said through-opening;

whereby after said through-opening receives said adapter, said adapter is rotated and said at least one tab cooperates with said at least one slot, and said adapter becomes fixedly disposed in said receptor.

10. The apparatus of claim 9 wherein said apparatus further comprises means for lockably securing said at least one tab in engagement with said at least one slot.

11. The apparatus of claim 10 wherein said means for lockably securing comprises a detent disposed on said at least one tab and a cooperating recess defined on a face of said at least one slot.

12. The apparatus of claim 10 wherein said means for lockably securing comprises a detent disposed on a face of said at least one slot and a cooperating recess defined on said at least one tab.

13. The apparatus of claim 10 wherein said means for lockably securing comprises said at least one slot wherein said at least one slot is a tapered opening having an inside front surface and an inside back surface, said inside front surface and said inside back surface having a separating distance which is decreasing in size towards the distal end as defined by a line perpendicular to the long axis of the through-opening, whereby friction forces provide said means for lockably securing said adapter flange in second aperture.

14. The apparatus of claim 9 wherein said receptor is a mounting plate with a front surface and a back surface disposed in substantially parallel planes.

15. The apparatus of claim 9 wherein said receptor has a front surface and a back surface disposed in intersecting planes.

16. The apparatus of claim 9 wherein said through-opening has a seating lip which prevents said at least one tab from passing through said receptor, said seating lip disposed such that said at least one tab can cooperate with said at least one slot when said at least one tab is in contact with said seating lip and said adapter is rotated.

17. An apparatus for mating a pair of fiber optic connectors, said apparatus comprising:

means for releasably coupling the pair of fiber optic connectors;

means for releasably securing said means for releasably coupling in a fixed position to a surface.

18. The apparatus of claim 17 wherein said means for releasably securing comprises said means for releasably coupling having means for cooperating with said surface.

19. The apparatus of claim 18 wherein said means for cooperating with said surface comprises said means for releasably coupling having at least one member which cooperates with at least one slot in said surface when said means for releasably coupling is rotated relative to said surface.

20. The apparatus of claim 17 wherein said apparatus further comprises means for lockably securing said means for releasably coupling to said surface.

21. An apparatus for mating a pair of fiber optic connectors, said apparatus comprising:

and adapter including an adapter body and an adapter flange;

a receptor having a first aperture configured to releasably receive said adapter flange, and a second aperture cooperating with said adapter flange when said adapter body is rotated; and a means for lockably securing said adapter flange in second aperture, wherein said means for lockably securing comprises an inside back surface of said second aperture, an inside front surface of said second aperture, and an inside stop surface of said second aperture, wherein the distance between said inside back surface and said inside front surface varies from a maximum separation greater than the thickness of said adapter flange to a minimum separation, disposed at said inside stop surface, approximately equal to the thickness of said adapter flange, whereby friction forces provide said means for lockably securing said adapter flange in second aperture;

whereby after said first aperture receives said adapter flange, said adapter body is rotated and said adapter flange cooperates with second aperture, and said adapter becomes fixedly disposed in said receptor.

22. An apparatus for mating a pair of fiber optic connectors, said apparatus comprising:

an adapter including a coupler configured to releasably receive the pair of fiber optic connectors and at least one tab extending outwardly from said coupler;

a receptor defining a through-opening configured to releasably receive said adapter, said through-opening defining at least one slot cooperating with said at least one tab, said slot receiving said tab when said adapter is rotated within said through-opening; and a means for lockably securing said at least one tab in engagement with said at least one slot, wherein said means for lockably securing comprises said at least one slot wherein said at least one slot is a tapered opening having an inside front surface and an inside back surface, said inside front surface and said inside back surface having a separating distance which is decreasing in size towards the distal end as defined by a line perpendicular to the long axis of the through-opening, whereby friction forces provide said means for lockably securing said adapter flange in second aperture whereby after said through-opening receives said adapter, said adapter is rotated and said at least one tab cooperates with said at least one slot, and said adapter becomes fixedly disposed in said receptor.

* * * * *